United States Patent
Treichler et al.

(10) Patent No.: US 9,147,224 B2
(45) Date of Patent: Sep. 29, 2015

(54) METHOD FOR HANDLING STATE TRANSITIONS IN A NETWORK OF VIRTUAL PROCESSING NODES

(75) Inventors: Sean J. Treichler, Sunnyvale, CA (US);
Lacky V. Shah, Los Altos Hills, CA (US); Daniel Elliot Wexler, Soda Springs, CA (US)

(73) Assignee: NVIDIA Corporation, Santa Clara, CA (US)

( * ) Notice: Subject to any disclaimer, the term of this patent is extended or adjusted under 35 U.S.C. 154(b) by 715 days.

(21) Appl. No.: 13/294,983

(22) Filed: Nov. 11, 2011

(65) Prior Publication Data
US 2013/0120413 A1    May 16, 2013

(51) Int. Cl.
*G06T 1/20*        (2006.01)
(52) U.S. Cl.
CPC .......................................... *G06T 1/20* (2013.01)
(58) Field of Classification Search
CPC ......... G06T 1/20; G06T 15/005; G06F 9/461; G06F 1/3228
USPC ................................................... 345/522, 506
See application file for complete search history.

(56) References Cited

U.S. PATENT DOCUMENTS

| 7,737,983 | B2 * | 6/2010 | Brothers et al. ............... | 345/522 |
| 2009/0172677 | A1 * | 7/2009 | Mantor et al. ................ | 718/101 |

\* cited by examiner

*Primary Examiner* — Hau Nguyen
(74) *Attorney, Agent, or Firm* — Artegis Law Group, LLP

(57) ABSTRACT

One embodiment of the present invention sets forth a technique for receiving versions of state objects at one or more stages in a processing pipeline. The method includes receiving a first version of a state object at a first stage in the processing pipeline, determining that the first version of the state object is relevant to the first stage, incrementing a first reference counter associated with the first version of the state object, assigning the first version of the state object to work requests that arrive at the first stage subsequent to the receipt of the first version of the state object, and transmitting the first version of the state object to a second stage in the processing pipeline.

23 Claims, 12 Drawing Sheets

METHOD FOR HANDLING STATE TRANSITIONS IN A NETWORK OF VIRTUAL PROCESSING NODES

BACKGROUND OF THE INVENTION

1. Field of the Invention

The present invention generally relates to graphics processing and more specifically to a method for handling state transitions in a network of virtual processing nodes.

2. Description of the Related Art

Consider a network of pipeline stages where each pipeline stage is processing work input that, when completed, is forwarded from the output of one pipeline stage to the input of another pipeline stage. The network of pipeline stages could be ordered in a linear fashion effectively making it into a traditional processing pipeline, or the network could be more complicated an include splits, and joins and loops of outputs/inputs.

Each pipeline stage relies on state data that indicates how work input received by the pipeline stage should be processed. In particular, state data includes a set of member variables that control how data is processed. For example, a rasterizer pipeline stage might require a current polygon color or a flag for culling back-facing polygons. Typically, these values change over time, and such changes must be propagated to the pipeline stages.

In a simple approach, state changes are propagated to the pipeline stages by draining the pipeline stages, reconfiguring the pipeline stages with new state data, and transmitting work input back into the pipeline stages. This approach, however, is inefficient since considerable delays are introduced as a result of draining the pipeline stages. In another approach, work input sent to the pipeline stages is accompanied by state data that corresponds to the work input. Though this approach does not require that the pipeline be drained, state data is unnecessarily and redundantly transmitted throughout the network, which is inefficient.

Accordingly, what is needed in the art is a system and method for propagating state data to pipeline stages.

SUMMARY OF THE INVENTION

One embodiment of the present invention sets forth a method for receiving versions of state objects at one or more stages in a processing pipeline. The method comprises the steps of receiving a first version of a state object at a first stage in the processing pipeline, determining that the first version of the state object is relevant to the first stage, incrementing a first reference counter associated with the first version of the state object, assigning the first version of the state object to work requests that arrive at the first stage subsequent to the receipt of the first version of the state object, and transmitting the first version of the state object to a second stage in the processing pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
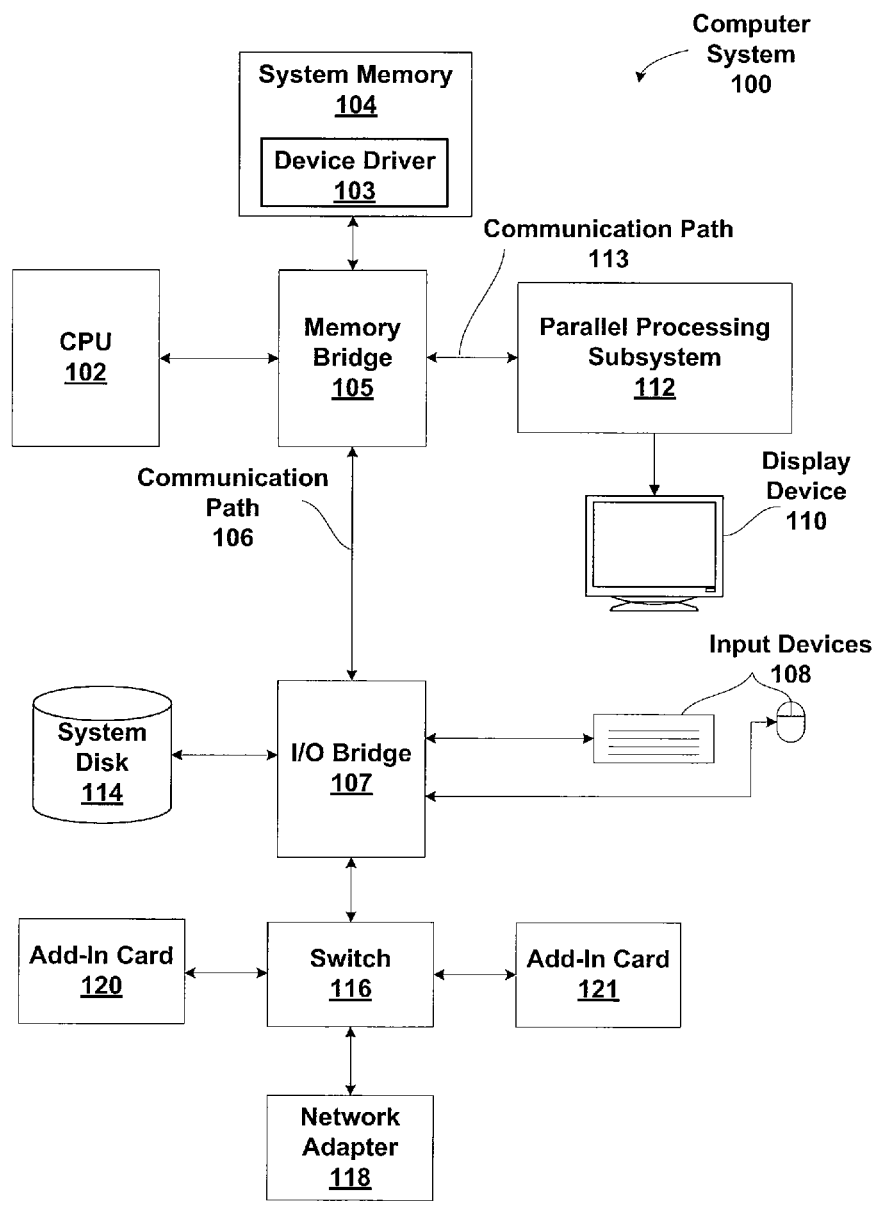
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
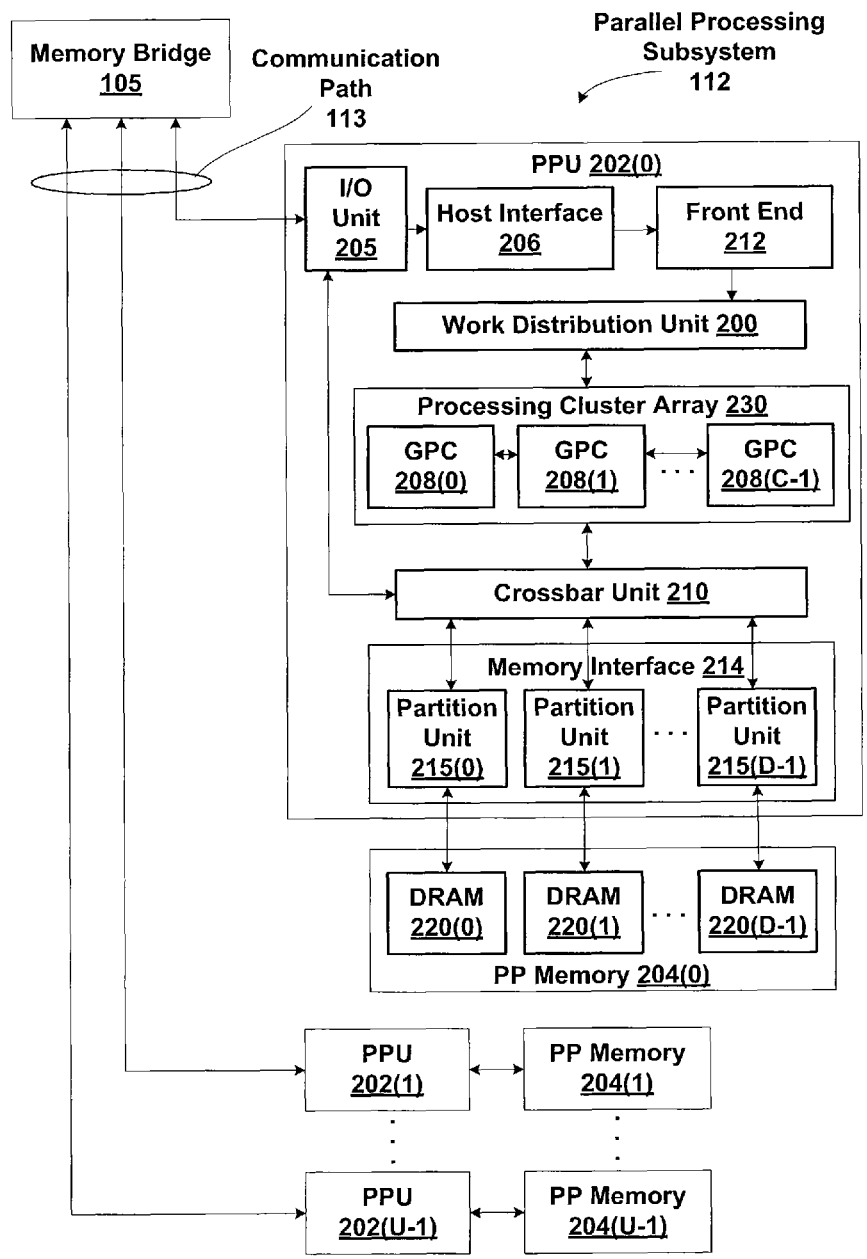
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
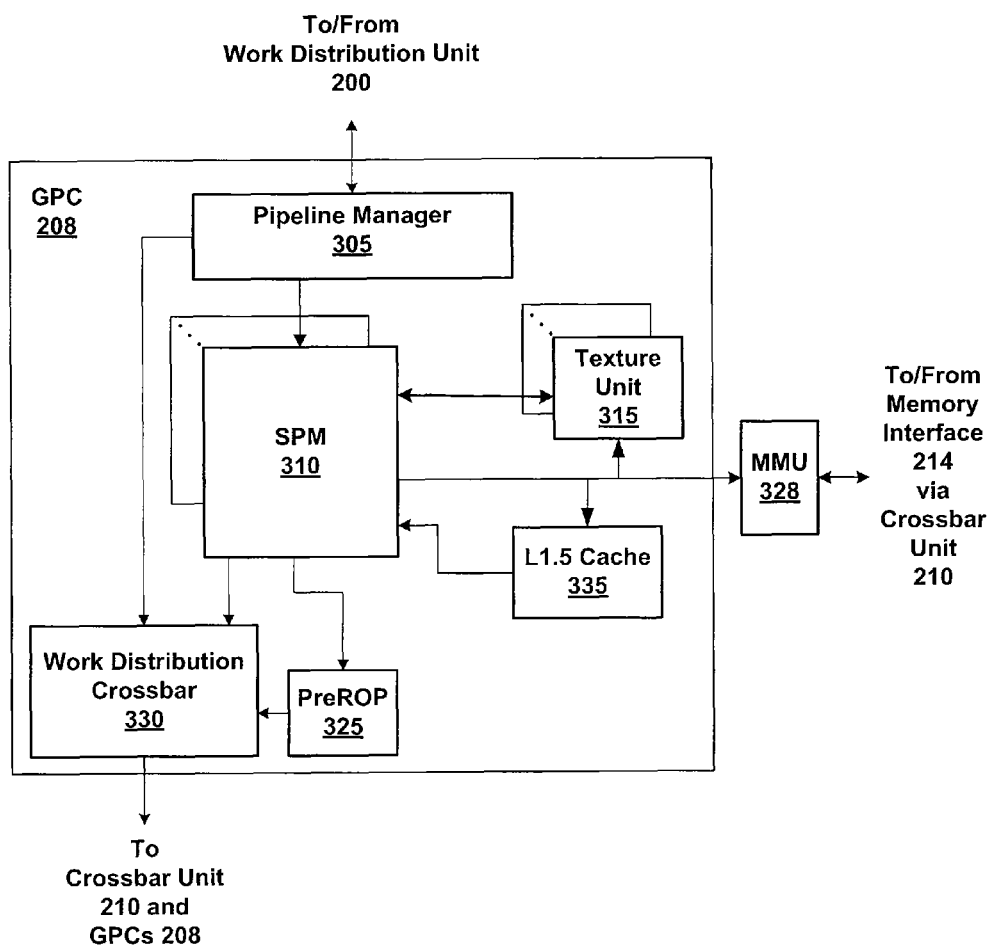
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
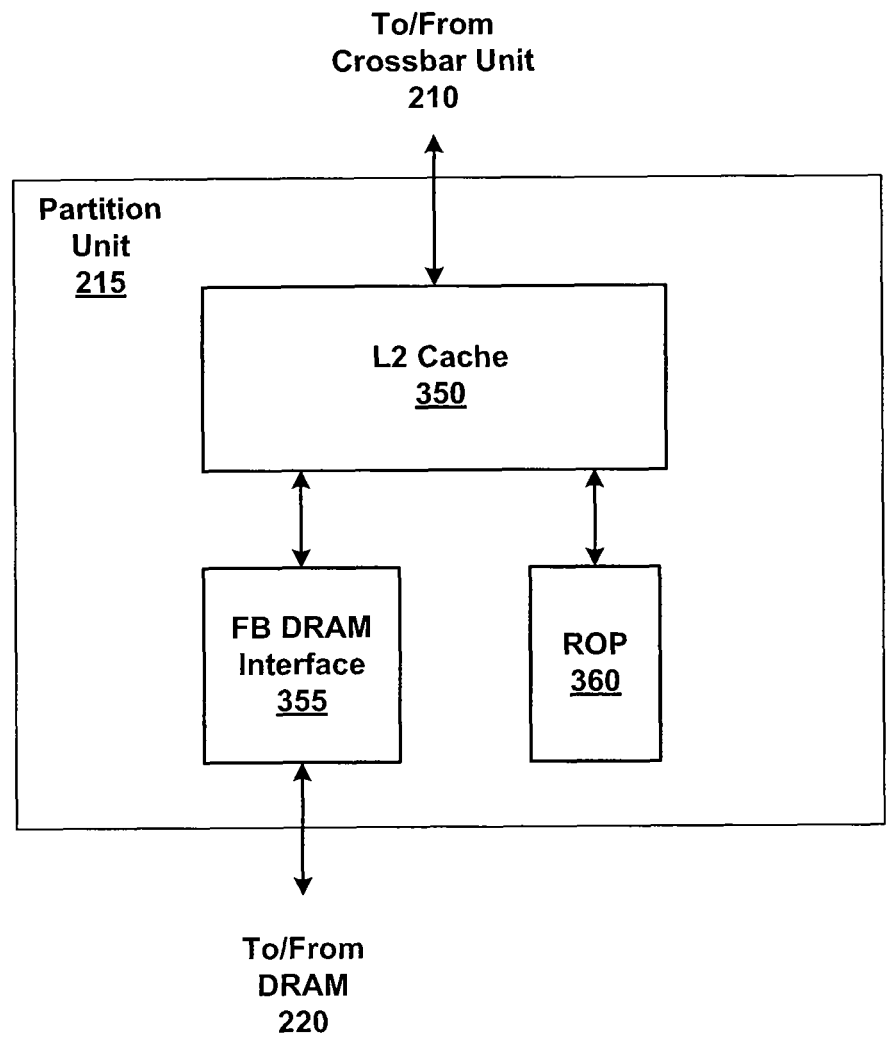
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of a thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
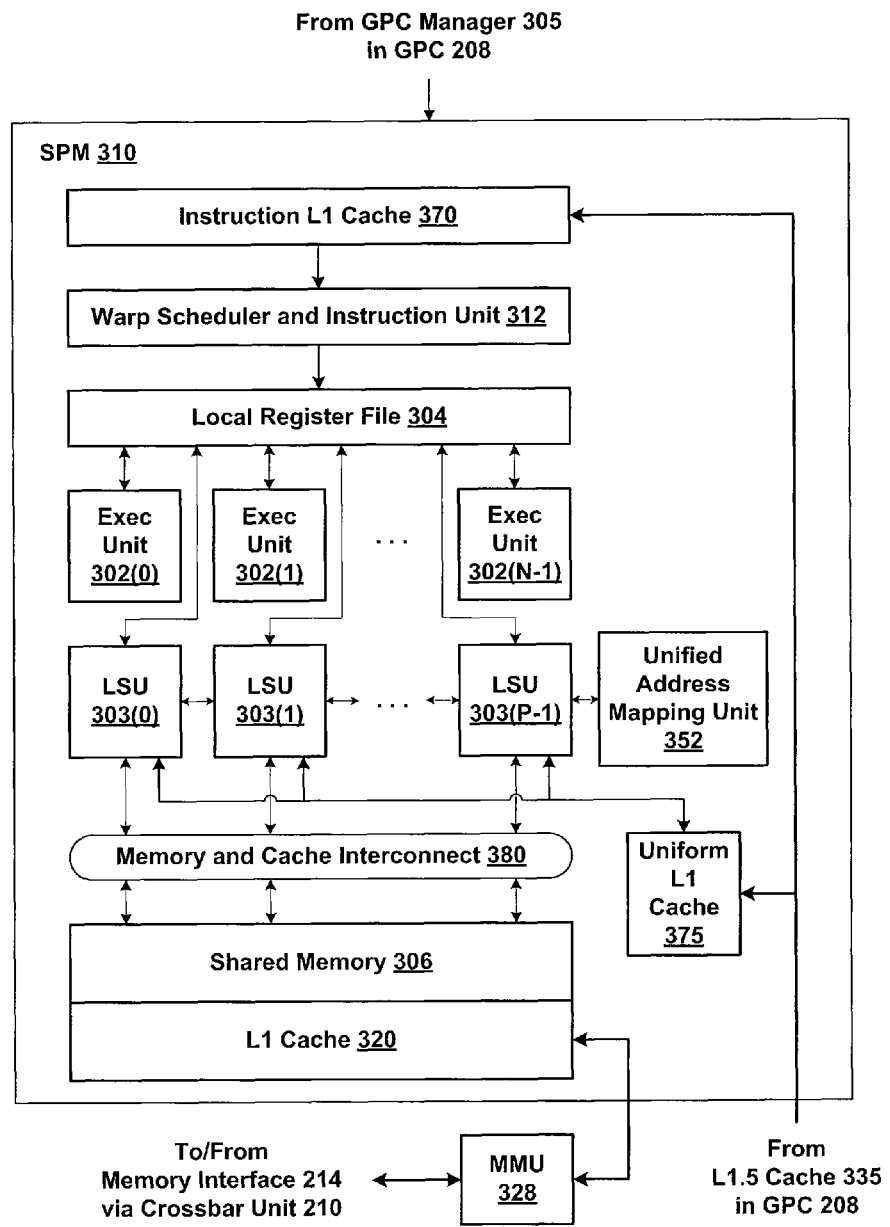
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
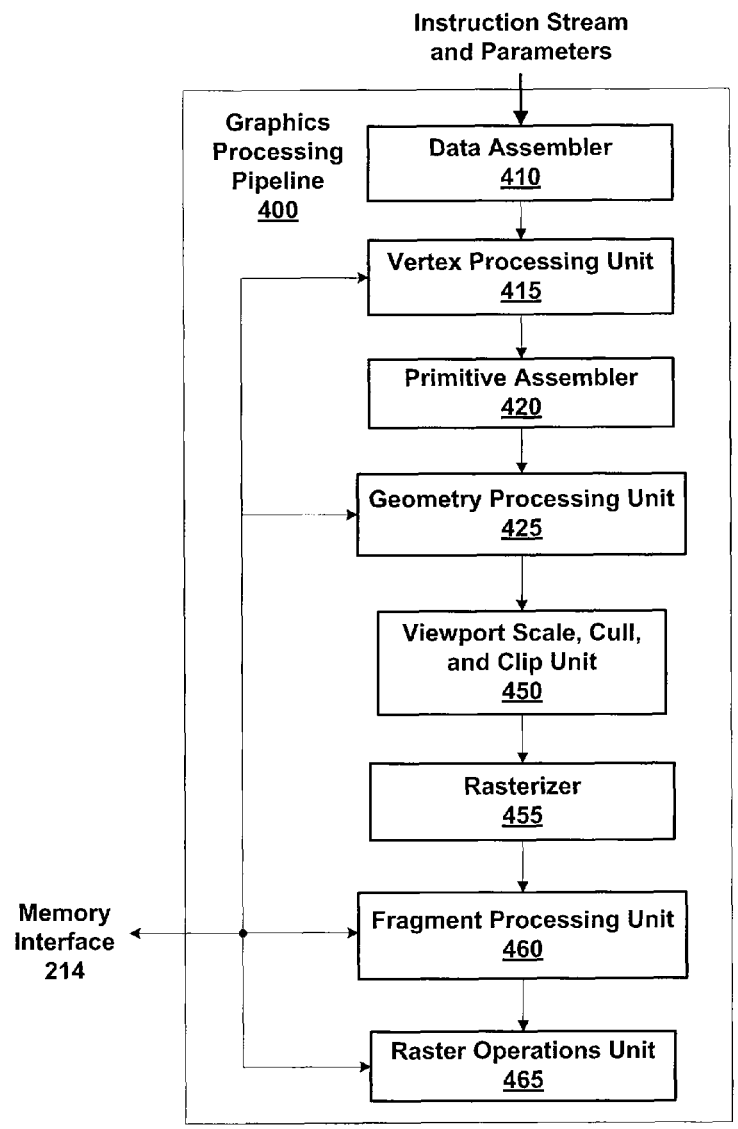
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Figure 5A:
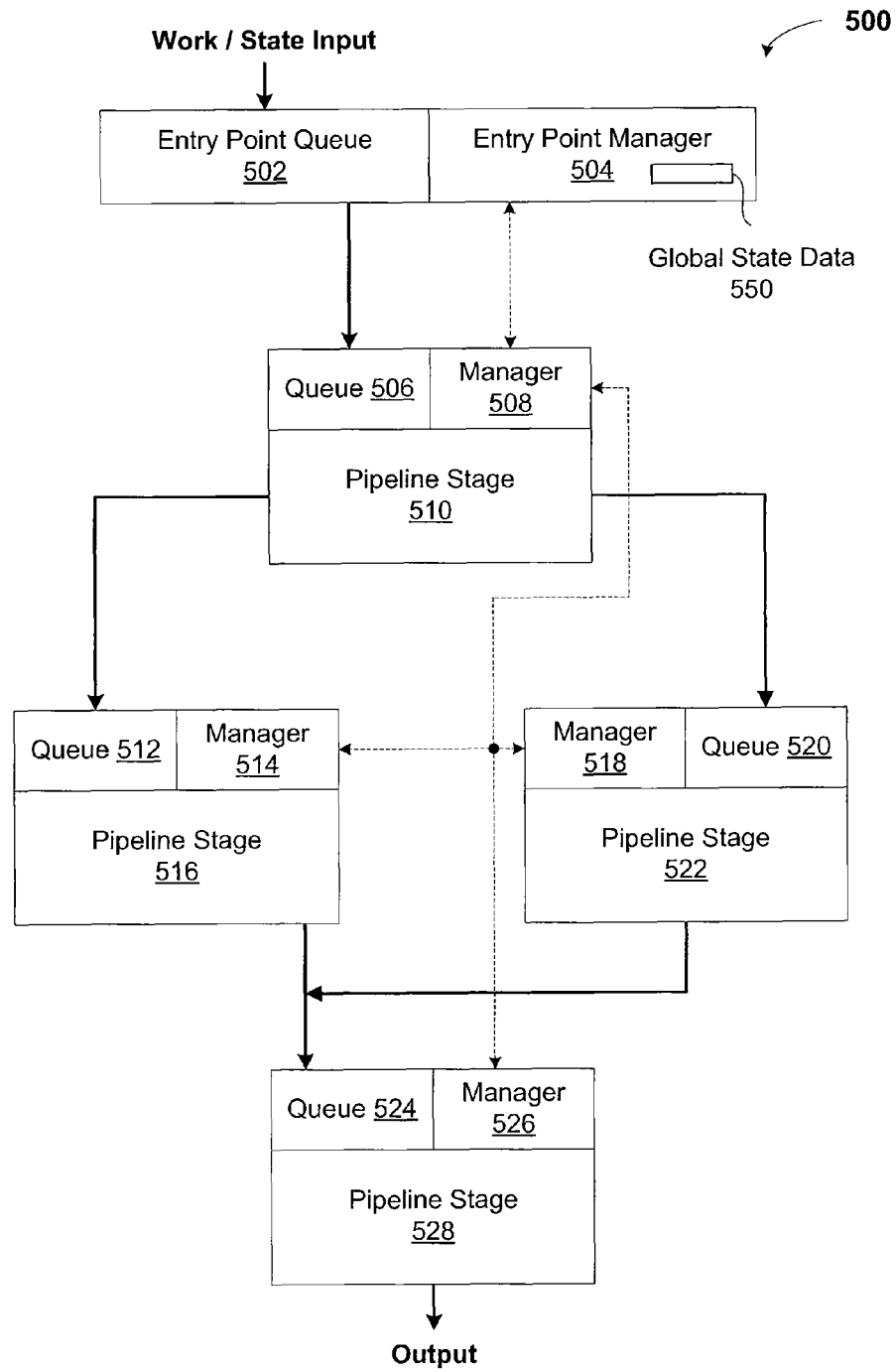
FIGS. 5A, 5B and 5C are conceptual diagrams illustrating a customized processing pipeline in which embodiments of the invention may be implemented.
Figure 5B:
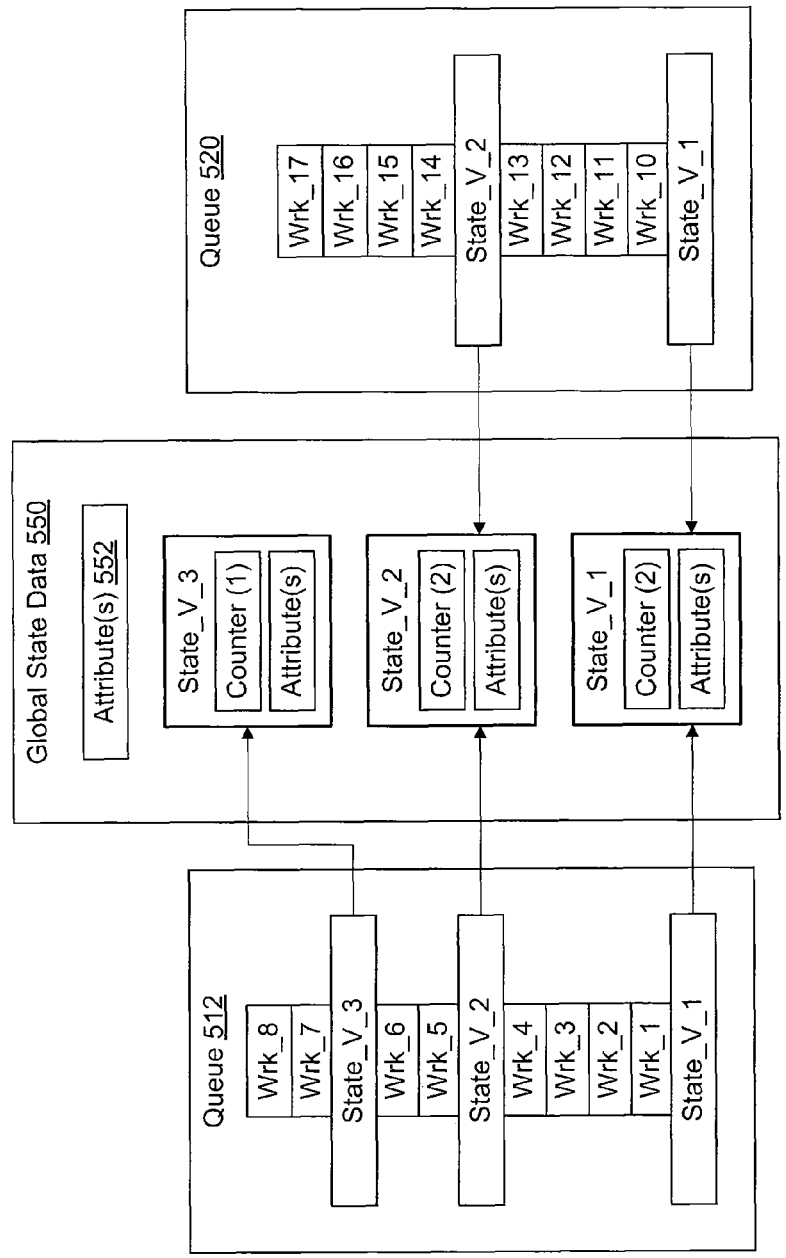
Figure 5C:
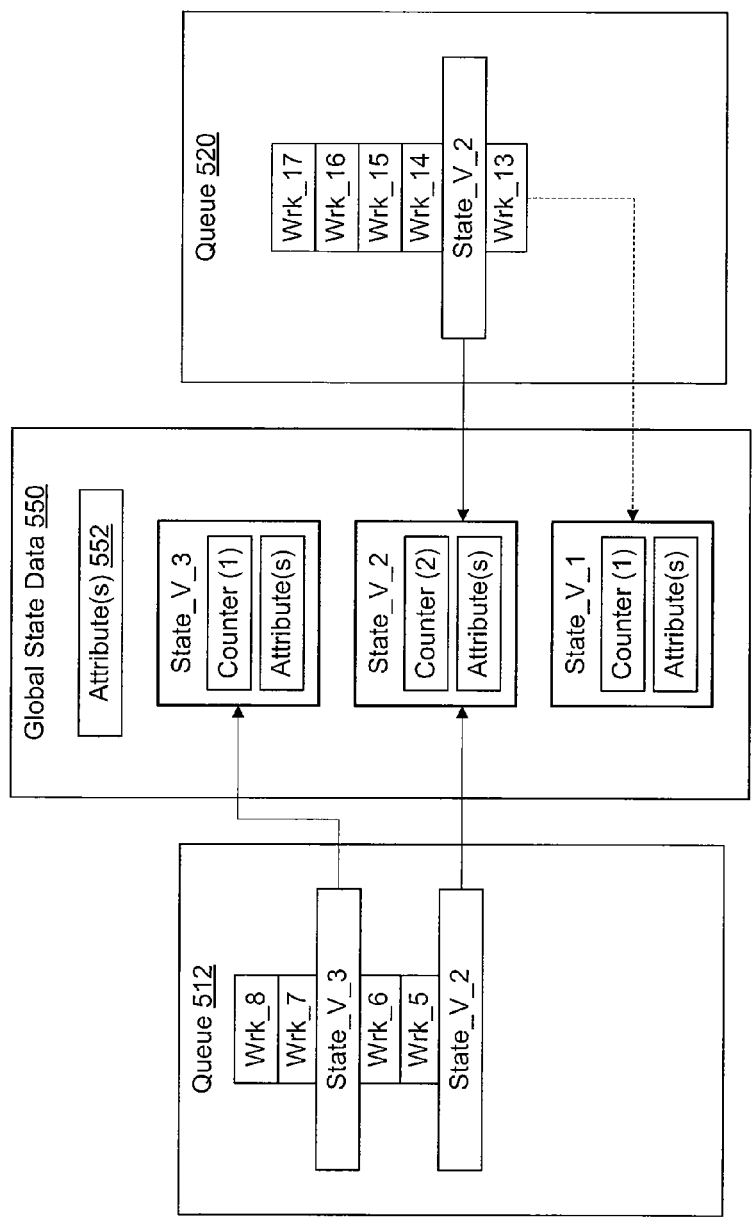

Method for Handling State Transitions in a Network of Virtual Processing Nodes FIGS. 5A, 5B and 5C are conceptual diagrams illustrating a customized processing pipeline 500 in which embodiments of the invention may be implemented. Customized processing pipeline 500 represents an arbitrary processing pipeline that is configured, e.g., by a developer that writes a software application that, when executed by one or more PPUs 202, creates a network of pipeline stages 510, 516, 522 and 528. As shown, customized processing pipeline 500 begins at entry point queue 502, which is managed by entry point manager 504.

In one embodiment, entry point manager 504 pushes work/state input into entry point queue 502 until entry point manager 504 determines that queues included in each of the pipeline stages of customized processing pipeline 500 are available to receive the work/state input. In one embodiment, each of the entry point manager 504, manager 508, manager 514, manager 518 and manager 526 are in communication with one another to make the foregoing determination.

As illustrated in FIG. 5A, pipeline stage 510 includes queue 506 and is under the control of manager 508, where queue 506 receives work/state input from entry point queue 502. As also illustrated in FIG. 5A, the output of pipeline stage 510 feeds into queue 512, which is included in pipeline stage 516 and managed by manager 514. The output of pipeline stage 510 also feeds into queue 520, which is included in pipeline stage 522 and managed by manager 518. Thus, the output of pipeline stage 510 creates a "fork" in customized processing pipeline 500.

Finally, the outputs of pipeline stage 516 and pipeline stage 522 feed into queue 524, which is included in pipeline stage 528 and managed by manager 526. Thus, the outputs of pipeline stage 516 and pipeline stage 522 eliminate the fork and restore the customized processing pipeline to a single, linear system. Though not illustrated, the output of pipeline stage 528 may continue on to additional pipeline stages through various connections, loopbacks and forks included in customized processing pipeline 500.

Embodiments of the invention provide a technique whereby versions of state data that are used in conjunction with processing work are received at and managed by each pipeline stage. In one embodiment, entry point manager 504 manages a global state object 550 that includes various state attributes 522 (illustrated in FIG. 5B) used by each of the pipeline stages 510, 516, 522 and 528 when processing work. For example, global state object 550 may include a camera angle state attribute and a zoom level state attribute associated with a particular 3D scene that customized processing pipeline 500 is configured to actively render.

Typically, information included in the global state object 550 changes as the 3D scene is updated, e.g., when the camera angle changes to a new position within the 3D scene. Entry point manager 504 receives each state data attribute update and creates a state version object that refers to the global state object 550 and stores only the updated attributes. In this way, multiple versions of the global state object 550 may be referenced by the pipeline stages 510, 516, 522 and 528, without requiring that multiple copies of all attributes included in global state object 550 be redundantly stored in memory. As is described in further detail below, each state version object is associated with a reference count so that the state version object may be deleted from memory when pipeline stages 510, 516, 522 and 528 no longer rely on the state version object.

FIG. 5B illustrates a more detailed view of global state object 550, and a snapshot of a portion of customized processing pipeline 500 while processing arbitrary work/state input. As shown, queues 512 and 520, which are included in pipeline stages 516 and 522, respectively, each store work/state input since they each are configured to receive the forked output of pipeline stage 510.

As shown in queue 512, a pointer to a state version object "State_V_1" precedes work inputs "Wrk_1", "Wrk_2", "Wrk_3" and "Wrk_4", whereas in queue 520, a pointer to the state version object "State_V_1" precedes work inputs "Wrk_10", "Wrk_11", "Wrk_12", and "Wrk_13". Also shown in queue 512 is a pointer to a state version object "State_V_2" that precedes work inputs "Wrk_5" and "Wrk_6", whereas, in queue 520, a pointer to the state version object "State_V_2" precedes work inputs "Wrk_14", "Wrk_15", "Wrk_16", and "Wrk_17". Further shown in queue 512 is a pointer to state version object "State_V_3" that precedes work inputs "Wrk_7" and "Wrk_8".

In the example illustrated in FIG. 5B, queues 512 and queue 520 operate according to a first-in-first-out (FIFO) paradigm, such that a pointer to state version object "State_V_1" is first popped from, e.g., queue 512. Manager 514 identifies a pointer to state version object "State_V_1" and configures pipeline stage 516 to execute all subsequent work input, i.e., "Wrk_1", "Wrk_2", "Wrk_3" and "Wrk_4", according to the attributes included in state version object "State_V_1". As shown, the pointer to state version object "State_V_1" stored in queue 512 references the actual "State_V_1" state version object included in global state object 550. As also shown, the actual "State_V_1" state version object includes a reference counter and one or more modified attributes of global state object 550, as described above.

FIG. 5C illustrates an updated snapshot of the portion of customized processing pipeline after pipeline stage 516 associated with queue 512 has completed processing work inputs "Wrk_1", "Wrk_2", "Wrk_3" and "Wrk_4", and after pipeline stage 522 associated with queue 512 has completed processing work inputs "Wrk_10", "Wrk_11", and "Wrk_12". As shown, the reference counter included in state version object "State_V_1" is decremented to a value of "1" in view of pipeline stage 516 (associated with queue 512) completing all work input associated with state version object "State_V_1". Any increment/decrement operation made to the reference counter is performed atomically to avoid simultaneous updates being made to the reference counter when the state version object is being modified by two or more pipeline stage managers. A more detailed description of receiving and managing state version objects is described below in conjunction with FIG. 6.

Figure 6:
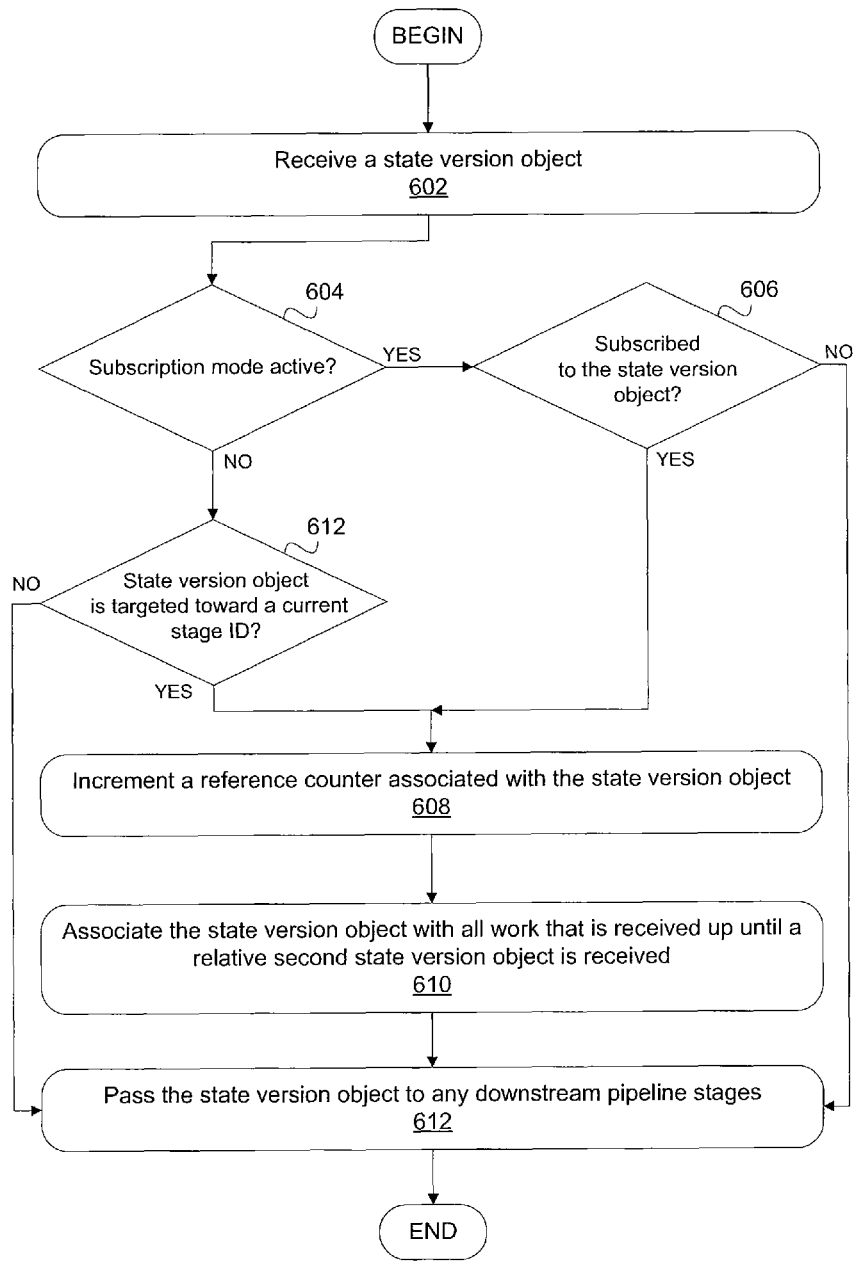
FIG. 6 is a flow diagram of method steps for receiving and managing state version objects, according to one embodiment of the present invention.

FIG. 6 is a flow diagram of method steps 600 for receiving and managing state version objects, according to one embodiment of the present invention. Although the method steps are described in conjunction with the systems of FIGS. 1, 2, 3A, 3B, 3C, 4, 5A, 5B and 5C, persons skilled in the art will understand that any system configured to perform the method steps, in any order, is within the scope of the invention. As shown, method 600 begins at step 602, where a manager 508 receives a state version object, as described above in conjunction with FIGS. 5A-5C.

As is described in detail below, embodiments of the invention provide two distinct techniques that enable manager 508 to receive "relative" state version objects, i.e., state version objects that apply to the work being processed by the pipeline stage 510 with which manager 508 is associated.

The first technique, referred to herein as "subscription mode," involves assigning to each state version object a logical name that typically refers to the type of attribute(s) that is/are included in the state version object, e.g., "main_camera_angle". Accordingly, each pipeline stage manager is assigned a list of logical names of state version objects to which the manager is subscribed.

The second technique, referred to herein as "stage identifier (ID) mode," involves assigning to each state version object one or more stage identifiers (IDs) of pipeline stages that are required to implement the state version object, e.g., "pipeline_stage_516". Accordingly, each pipeline stage manager, upon receiving a state version object, checks the one or more stage IDs assigned to the state version object to determine whether a stage ID of the pipeline stage manager matches any of the one or more stage IDs.

At step 604, manager 508 determines whether the subscription mode is active. In one embodiment, manager 508 is assigned at initialization the mode in which it should operate, i.e., subscription mode or stage ID mode. If manager 508 determines that subscription mode is active, then method 600 proceeds to step 606, where manager 508 determines whether any of the state version objects to which manager 508 is subscribed match the received state version object.

If, at step 606, manager 508 determines that it is subscribed to the state version object, then method 600 proceeds to step 608, where manager 508 increments a reference counter associated with the state version object. At step 610, manager 508 associates the state version object with all work that is receive up until a second, relative state version object is received. For example, when manager 508 receives a second state version object with a logical name to which it is subscribed, then all work that is received subsequent to receiving the second state version object is associated with the second state version object.

Referring back now to step 606, if manager 508 determines that it is not subscribed to the state version object, then method 600 proceeds to step 612, where manager 508 passes the state version object to any downstream pipeline stages. Accordingly, managers of the downstream pipeline stages also execute method 600 in response to receiving the state version object.

Referring back now to step 604, if manager 508 determines that subscription mode is not active, then, implicitly, stage identifier mode is active. At step 612, manager 508 determines whether the state version object is targeted toward the current stage ID associated with manager 508. If, at step 612, manager 508 determines that the state version object is targeted toward the current stage ID associated with manager 508, then method 600 proceeds to step 608, described above. Otherwise, method 600 proceeds to step 612, described above.

The state version objects described herein, and the reference counters associated therewith, may be modified to provide the functionality of triggering events when, for example, a reference counter associated with a state version object reaches a value of zero. In particular, the state version objects are modified to include a pointer to a reference count object, where the reference count object includes a counter, trigger data, and a specification of a queue included in a pipeline stage, e.g., queue 506, into which the trigger data should be pushed. A detailed description of the triggering technique is included below.

In some embodiments, a processing pipeline, such as customized processing pipeline 500, may be configured to manage different sets of global state data 550 both concurrently and according to different techniques. For example, a first set of global state data 550 may be delivered to stages in customized processing pipeline 500 via the subscription mode while a second set of global state data 500 may be delivered to the same stages in customized processing pipeline 500 via the stage ID mode. Additional examples of modes that may be used include flushing the processing pipeline for reconfiguration with new state data or tagging each work input with state data to which the work input corresponds.

Figure 7A:
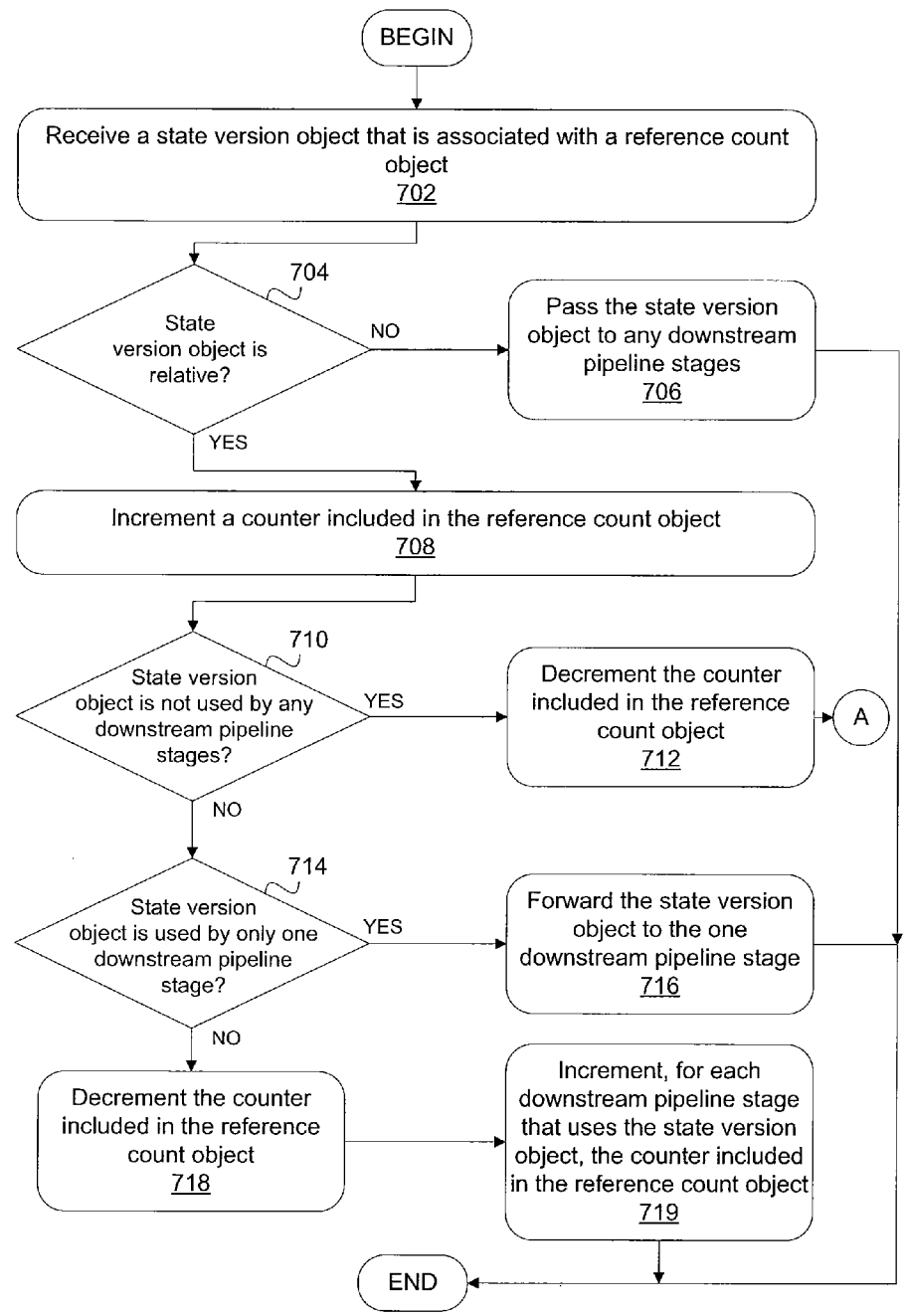
FIGS. 7A-7B is a flow diagram of method steps for triggering an action in response to a reference counter associated with a state version object being assigned a value of zero, according to one embodiment of the present invention.
Figure 7B:
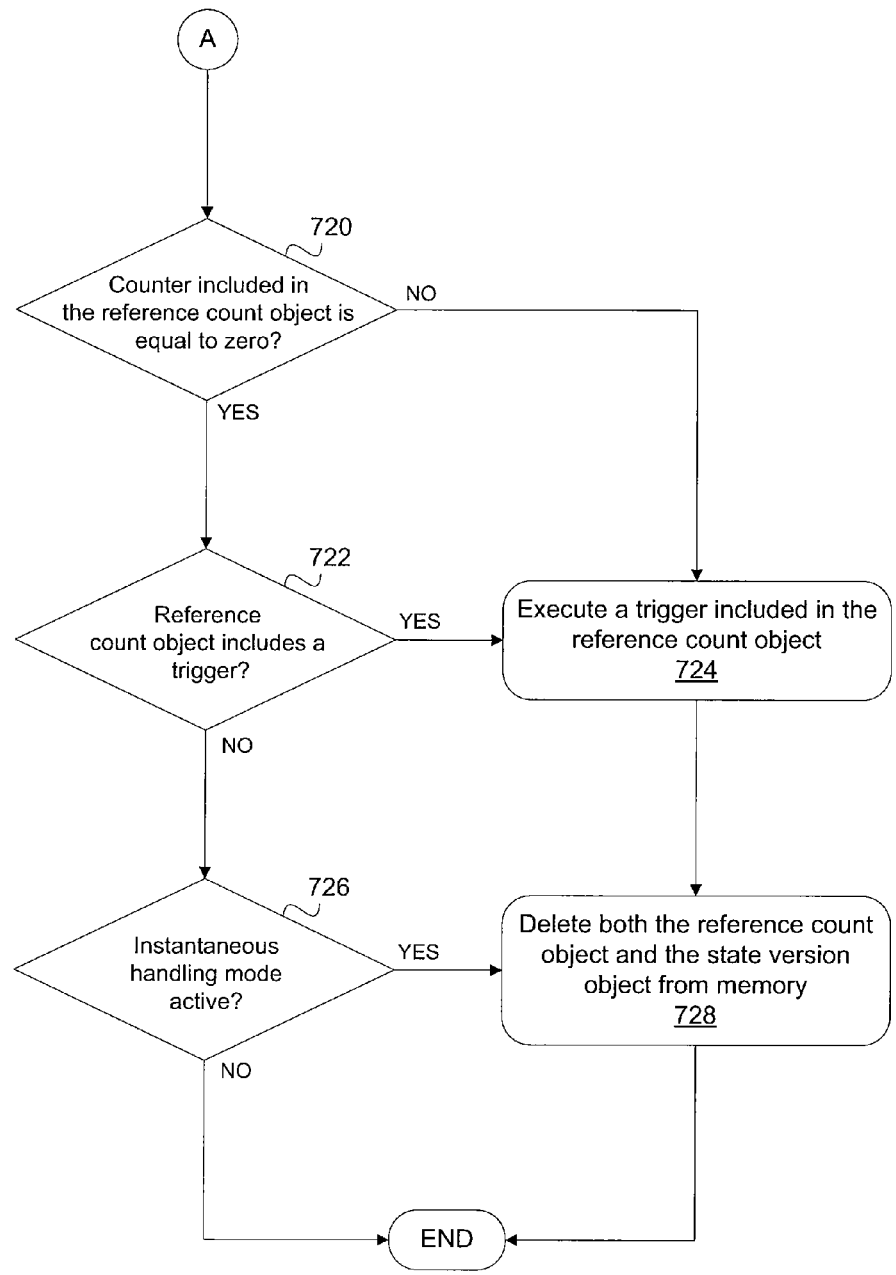

FIGS. 7A-7B is a flow diagram of method steps 700 for triggering an action in response to a reference counter associated with a state version object being assigned a value of zero, according to one embodiment of the present invention. Although the method steps are described in conjunction with the systems of FIGS. 1, 2, 3A, 3B, 3C, 4, 5A, 5B and 5C, persons skilled in the art will understand that any system configured to perform the method steps, in any order, is within the scope of the invention.

At step 702, manager 508 receives a state version object that is associated with a reference count object. In one embodiment, the state version object includes a pointer to a reference count object. In another embodiment, the reference count object is included in the state version object.

At step 704, manger 508 determines whether the state version object is relative according to the techniques described above in conjunction with FIG. 6. If, at step 704, manager 508 determines that the state version object is not relative, then method 700 proceeds to step 706, where manager 508 passes the state version object to any downstream pipeline stages, and method 700 ends. As described above in conjunction with FIG. 6, each of the downstream pipeline stages, upon receiving the state version object, is configured to execute method steps 700.

If, however, manager 508 determines at step 704 that the state version object is relative, then method 700 proceeds to step 708, where manager 508 increments a counter included in the reference count object.

At step 710, manager 508 determines whether the state version object is not used by any downstream pipeline stages. In one embodiment, manager 508 makes this determination by querying both manager 514 and manager 518 for their corresponding stage IDs and/or subscriptions. Manager 508 then determines based on the stage IDs and/or subscriptions whether the manager 514 and manager 518 will consider the stage version object as being relative.

If, at step 710, manager 508 determines that the state version object is not used by any downstream pipeline stages, then method 700 proceeds to step 712, where manager 508 decrements the counter included in the reference count object. Otherwise, method 700 proceeds to step 714, where manager 508 determines whether the state version object is used by only one downstream pipeline stage. If, at step 714, manager 508 determines that the state version object is used by only one downstream pipeline stage, then method 700 proceeds to step 716, where manager 508 forwards the state version object to the one downstream pipeline stage. Advantageously, when manager 508 confirms that only one downstream pipeline stage finds the state version object to be relative, manager 508 does not need to decrement the state version object since it will be immediately incremented by the one downstream pipeline stage upon receipt. In this way, the total number of updates made to the counter included in the reference count object.

Referring now back to step 714, if manager 508 determines that the state version object is not used by only one downstream pipeline stage, then implicitly two or more downstream pipeline stages use the state version object. Accordingly, method 700 proceeds to step 718, where manager 508 decrements the counter included in the reference count object since manager 508 no longer requires the state version object.

Next, at step 719, manager 508 increments, for each downstream pipeline stage that uses the state version object, the counter included in the reference count object.

Method steps 702-719 described above enable manager 508 to appropriately increment and decrement the counter included in the reference count object, which ensures that the state version object remains available until memory it is no longer needed by one or more pipeline stages.

FIG. 7B describes method steps 720-724, which, when executed by manager 508, advantageously enable manager 508 to perform one or more trigger functions in response to the state version object becoming obsolete.

At step 720, manger 508 determines whether the counter included in the reference count object is equal to zero, i.e., the state version object is no longer needed by any pipeline stages to which the state version object is relative.

If, at step 720, manager 508 determines that the counter included in the reference count object is equal to not equal to zero, then method 700 ends. Otherwise, method 700 proceeds to step 722, where manager 508 determines whether the reference count object includes a trigger. If, at step 722, manager 508 determines that the reference count object includes a trigger, then method 700 proceeds to step 724, where manager 508 executes a trigger included in the reference count object. In one example, the reference counter object includes a counter with a value of ten, where ten distinct pipeline stages are operating on a different portion of a 2D image. Continuing with this example, the reference counter object also includes trigger data that, when pushed into the queue that is referenced in the reference counter object, causes the 2D image to be displayed on a display device.

Referring back now to step 722, if manager 508 determines that the reference count object does not include a trigger, then method 700 proceeds to step 726, where manager 508 determines whether an instantaneous handling mode is active, i.e., manager 508 is required to delete the state version object when its reference count is equal to zero.

If, at step 726, manager 508 determines that the instantaneous handling mode is active, then method 700 proceeds to step 728, where manager 508 deletes both the reference count object and the state version object form memory. Otherwise, method 700 ends, and the reference count object/state version object are deleted from memory via, e.g., a garbage collector that periodically checks for reference count objects whose reference counter is set as zero.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for receiving versions of state objects at one or more stages in a processing pipeline, the method comprising:
   receiving a first version of a state object at a first stage in the processing pipeline, wherein the first version of the state object is included in a plurality of different versions of the state object;
   determining that the first version of the state object is relevant to the first stage;
   incrementing a first reference counter associated with the first version of the state object;
   assigning the first version of the state object to work requests that arrive at the first stage subsequent to the receipt of the first version of the state object; and
   transmitting the first version of the state object to a second stage in the processing pipeline.

2. The method of claim 1, wherein the first version of the state object is associated with a global state object that includes a plurality of state attributes.

3. The method of claim 2, wherein the first version of the state object includes one or more state attributes that are updated versions of state attributes included in the plurality of state attributes included in the global state object.

4. The method of claim 1, wherein the first version of the state object is relevant to the first stage when a logical name included in a list of subscriptions managed by the first stage matches a logical name of the first version of the state object.

5. The method of claim 1, wherein the first version of the state object is relevant to the first stage when a unique processing stage identifier of the first stage matches a stage identifier target of the first version of the state object.

6. The method of claim 1, wherein the first version of the state object is also relevant to the second stage.

7. The method of claim 1, further comprising:
   receiving a second version of the state object at the first stage;
   determining that the second version of the state object is relevant to the first stage;
   decrementing the first reference counter associated with the first version of the state object;
   incrementing a second reference counter associated with the second version of the state object;
   assigning the second version of the state object to work requests that arrive at the first stage subsequent to the receipt of the second version of the state object; and
   transmitting the second version of the state object to the second stage.

8. The method of claim 7, wherein one or more atomic operations are performed to increment or decrement the first reference counter and to increment the second reference counter.

9. The method of claim 1, wherein the state object is associated with at least one of a camera angle and a zoom angle.

10. The method of claim 1, wherein the first version of the state object is associated with a reference count object that includes the first reference counter.

11. The method of claim 1, further comprising:
    determining that the first reference counter is equal to zero; and
    in response, executing an operation specified by the reference count object.

12. A computer-readable storage medium storing instructions that, when executed by a processor, cause a computing device to receive versions of state objects at one or more stages in a processing pipeline, by performing the steps of:
    receiving a first version of a state object at a first stage in the processing pipeline, wherein the first version of the state object is included in a plurality of different versions of the state object;
    determining that the first version of the state object is relevant to the first stage;
    incrementing a first reference counter associated with the first version of the state object;
    assigning the first version of the state object to work requests that arrive at the first stage subsequent to the receipt of the first version of the state object; and
    transmitting the first version of the state object to a second stage in the processing pipeline.

13. The computer-readable storage medium of claim 12, wherein the first version of the state object is associated with a global state object that includes a plurality of state attributes.

14. The computer-readable storage medium of claim 13, wherein the first version of the state object includes one or more state attributes that are updated versions of state attributes included in the plurality of state attributes included in the global state object.

15. The computer-readable storage medium of claim 12, wherein the first version of the state object is relevant to the first stage when a logical name included in a list of subscriptions managed by the first stage matches a logical name of the first version of the state object.

16. The computer-readable storage medium of claim 12, wherein the first version of the state object is relevant to the first stage when a unique processing stage identifier of the first stage matches a stage identifier target of the first version of the state object.

17. The computer-readable storage medium of claim 12, wherein the first version of the state object is also relevant to the second stage.

18. The computer-readable storage medium of claim 12, further comprising:
    receiving a second version of the state object at the first stage;
    determining that the second version of the state object is relevant to the first stage;
    decrementing the first reference counter associated with the first version of the state object;
    incrementing a second reference counter associated with the second version of the state object;
    assigning the second version of the state object to work requests that arrive at the first stage subsequent to the receipt of the second version of the state object; and
    transmitting the second version of the state object to the second stage.

19. The computer-readable storage medium of claim 18, wherein one or more atomic operations are performed to increment or decrement the first reference counter and to increment the second reference counter.

20. A computing device that configures a graphics processing pipeline (GPP) to receive versions of state objects at one or more stages in a processing pipeline, the computing device comprising:
   a host processor coupled to a main memory; and
   a graphics adapter, wherein the graphics adapter is configured to:
      receive a first version of a state object at a first stage in the processing pipeline, wherein the first version of the state object is included in a plurality of different versions of the state object;
      determine that the first version of the state object is relevant to the first stage;
      increment a first reference counter associated with the first version of the state object;
      assign the first version of the state object to work requests that arrive at the first stage subsequent to the receipt of the first version of the state object; and
      transmit the first version of the state object to a second stage in the processing pipeline.

21. The computing device of claim 20, wherein the first version of the state object is associated with a global state object that includes a plurality of state attributes.

22. The computing device of claim 21, wherein the first version of the state object includes one or more state attributes that are updated versions of state attributes included in the plurality of state attributes included in the global state object.

23. The computing device of claim 20, wherein the first version of the state object is relevant to the first stage when a logical name included in a list of subscriptions managed by the first stage matches a logical name of the first version of the state object.

* * * * *